United States Patent [19]
Tanno et al.

[11] Patent Number: 5,233,582
[45] Date of Patent: Aug. 3, 1993

[54] OPTICAL WAVEGUIDE RECORDING MEDIUM PLAYING APPARATUS

[75] Inventors: Naohiro Tanno, Yamagata; Teruo Toma; Kiyofumi Chikuma, both of Tsurugashima, all of Japan

[73] Assignee: Pioneer Electronic Corporation, Tokyo, Japan

[21] Appl. No.: 800,089

[22] Filed: Nov. 29, 1991

[30] Foreign Application Priority Data

Feb. 19, 1991 [JP] Japan ................................ 3-24754
Feb. 19, 1991 [JP] Japan ................................ 3-24755

[51] Int. Cl.$^5$ .............................................. G11B 5/09
[52] U.S. Cl. ............................ 369/44.23; 369/44.22; 369/44.12; 369/100; 372/12
[58] Field of Search ............ 369/44.11, 44.12, 44.21, 369/44.22, 44.23, 44.25, 100, 107, 110, 118, 122, 44.13, 44.14, 112; 372/12, 13

[56] References Cited

U.S. PATENT DOCUMENTS

4,862,440 8/1989 Miyamoto et al. ............. 369/44.23

FOREIGN PATENT DOCUMENTS

0306342 3/1989 European Pat. Off.
0446063 9/1991 European Pat. Off.

OTHER PUBLICATIONS

Patent Abstracts of Japan, unexamined applications, P field, vol. 14, No. 508, Nov. 7, 1990.

The Patent Office Japanese Government, p. 6 p 1128, Kokai-No. 2-210 627 (Naohiro Tanno).

Primary Examiner—Paul M. Dzierzynski
Assistant Examiner—Don Wong
Attorney, Agent, or Firm—Sughrue, Mion, Zinn, Macpeak & Seas

[57] ABSTRACT

Disclosed is an optical waveguide recording medium playing apparatus which has a heterodyne detection optical system and uses a waveguide light delaying/reflecting device for a reference light generating optical system. This waveguide light delaying/reflecting device is provided with a transducer which is disposed in close proximity of an optical waveguide where light is guided and which generates a surface elastic wave, so that the surface elastic wave may propagate in the light propagating direction of the optical waveguide. A laser beam is guided on the otpical waveguide, and a high-frequency drive current modulated in a burst form is applied to an electrode to generate a surface elastic wave, thereby accomplishing the shifting and phase delay of the light frequency of the reference light which ensures information reproduction with the interaction with the laser beam and the surface elastic wave. This optical waveguide is formed by diffusing Ti, Rb or the like on a substrate of GaAs, SiO$_2$, or TeO$_2$. This waveguide light delaying/reflecting device can impart phase shifting of several times the wavelength A λ to ensure information reading from along waveguide.

13 Claims, 6 Drawing Sheets

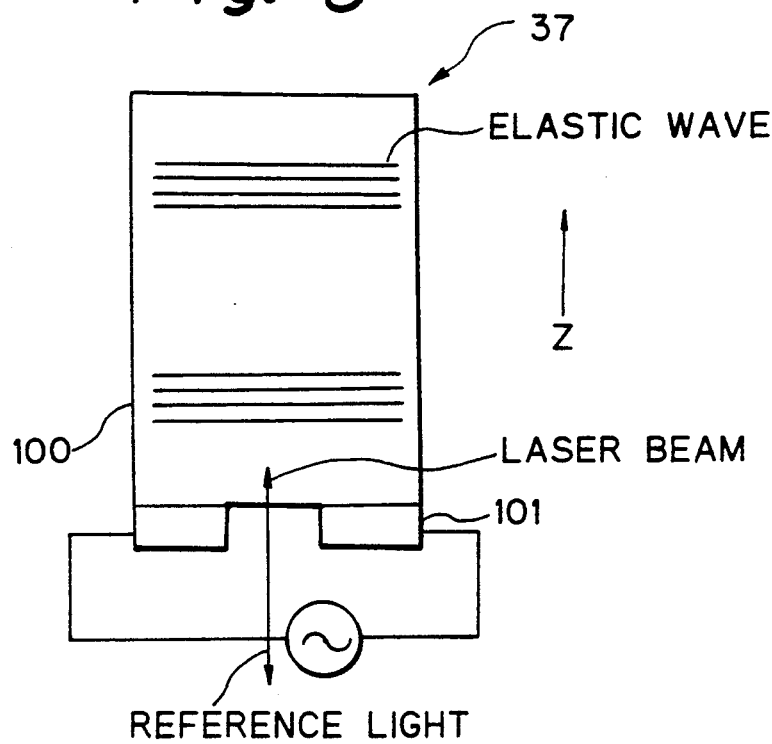
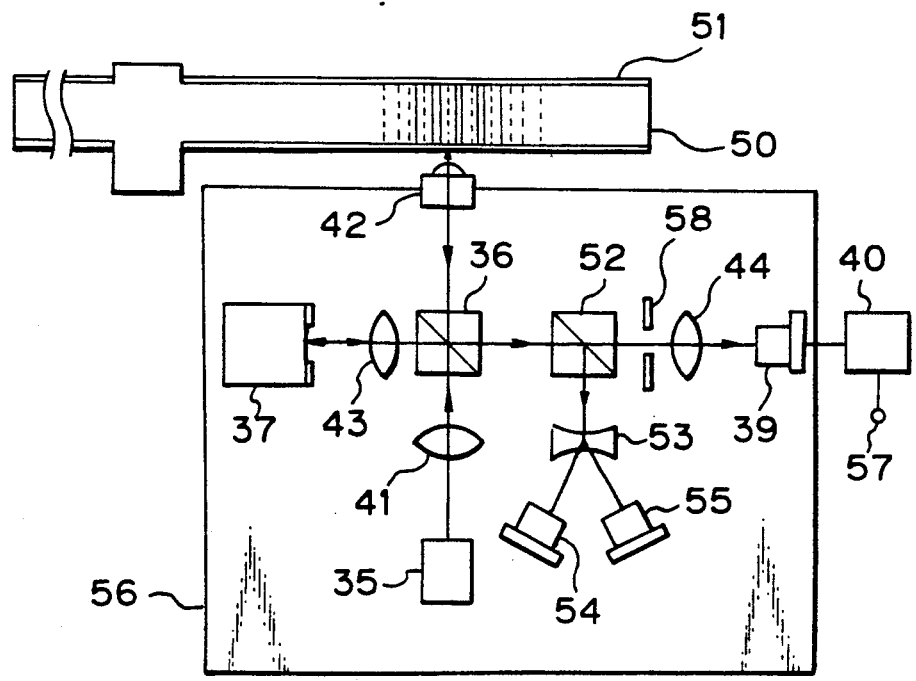

OPTICAL WAVEGUIDE RECORDING MEDIUM PLAYING APPARATUS

BACKGROUND OF THE INVENTION

1. Field of the Invention

The present invention relates to a playing apparatus which uses an optical recording medium, particularly an optical waveguide recording medium having an optical waveguide provided with refractive index-discontinuous portions to guide a laser beam (generally termed, including low coherent light beam) thereon to produce reflection of the guided beam having a plurality of different amplitudes and phase delays to perform optical heterodyne detection of the reflected part of the guided beam and Doppler-shifted laser beam, in order to reproduce recorded information as a time-series signal waveform.

2. Description of the Related Art

As a conventional optical recording medium there is an optical disk which has a plurality of low-reflectance recesses aligned in series as recorded information on a high-reflectance flat reflecting film that is formed as a recording film on a disk-shaped substrate. With this optical recording medium in use, a laser beam is irradiated and converged on the row of recesses to detect the difference between the amount of reflected light from the reflecting film and that of the recesses as recorded information. Another type of optical recording medium is a photomagnetic disk which has a plurality of minute magnetization-inverted regions aligned on a uniaxial-magnetic anisotropic recording film to record information. With this optical recording medium in use, the difference between the rotational angles of the polarizing planes of the reflected lights from the magnetization-inverted regions is detected as recorded information.

As information is reproduced from those optical recording media by utilizing the reflected light from the row of recesses or magnetization-inverted regions serving as a recording portion, there is a limit to the surface density of the recording portion. At the time of information reproduction from those optical recording media, the focal point of the laser beam is shifted along the optical axis so as to follow up the surface vibration of the optical recording media. A focusing is however necessary for each spot of the recording portion. Further, the reflectance of the reflected light and the rotational angle of the polarizing plane are very small, the signal-to-noise (S/N) ratio of an optical signal to be detected is low. In addition, as a time-series signal is reproduced only by the movement of a row of recording portions, the access time for information reproduction and recording is restricted by the moving speed of the optical recording medium.

Japanese Unexamined Patent Publication No. 2-210627 discloses an optical waveguide recording medium and a playing apparatus therefor which have been developed to overcome the above shortcomings.

A playing apparatus for an optical waveguide recording medium has been proposed which has a Michelson interferometer type optical heterodyne detecting optical system. This playing apparatus comprises a collimator lens for converting a radial laser beam from a light source into a flux of parallel light, a half mirror for causing divergence of a laser beam to be guided on an optical waveguide recording medium, an objective lens for coupling one part of the divergent laser beam to an optical waveguide, a movable mirror for causing a phase shift and a frequency shift on the other part of the divergent laser beam to provide reference light, and a photodetector for causing interference between the signal light reflected by and returning from refractive index-discontinuous portions formed on the optical waveguide and the reference light for heterodyne detection of the optical output.

Since this playing apparatus utilizes the movable mirror as a means to subject the divided laser beam to phase shift and frequency modulation for heterodyne detection, the modulation frequency is limited, thus restricting the improvement of the information density. What is more, the presence of the mirror driving section impedes miniaturization of the reproducing optical system and improvement of its reliability.

SUMMARY OF THE INVENTION

It is therefore an object of the present invention to provide a miniaturized optical waveguide recording medium playing apparatus capable of widening the modulation frequency of reference light.

According to a first embodiment of the present invention, there is provided a playing apparatus for reproducing recorded information from a optical waveguide recording medium provided with an optical waveguide having a photocoupler for guiding a laser beam and a plurality of refractive index-discontinuous portions aligned on the optical waveguide, shapes and relative positions of the refractive index-discontinuous portions being variables of information to be recorded, which apparatus comprises a light emitting means for generating a laser beam; a beam splitting means for bisecting the laser beam into first and second light beams; a reference light generating means for receiving the first light beam and frequency-shifting the first light beam for modulation to generate reference light; an irradiating means for guiding the second light beam to the photocoupler; a light superimposing means for superimposing reflected signal light, reflected at the refractive index-discontinuous portions, subjected to amplitude and phase modulations, and returning via the photocoupler, onto the reference light to produce interference light; and a photodetecting means for performing photoelectric conversion of the interference light to provide an electric output, the reference light generating means including a waveguide light delaying/reflecting element having an optical waveguide extending along an optical axis of the first light beam and a surface elastic wave electrode, disposed in proximity of the optical waveguide, for generating a surface elastic wave in a light propagating direction of the optical waveguide in order to supply intermittent high-frequency power to the surface elastic wave electrode.

According to a second embodiment of an optical waveguide recording medium playing apparatus of the present invention, the reference light generating means includes an acoustooptic light delaying/reflecting element having a transparent acoustooptic medium block extending along an optical axis of the first light beam and an ultrasonic wave generating element, disposed on the acoustooptic medium block at the end face where the first light beam enters, for generating an acoustic wave in a light propagating direction of the acoustooptic medium block in order to supply intermittent high-frequency power to the ultrasonic wave generating means according to the present invention the optical waveguide recording medium playing apparatus having a heterodyne detecting optical system with broadened modulation frequency of reference light can be provided.

BRIEF DESCRIPTION OF THE DRAWINGS

FIG. 5 is a plan view of an acoustooptic light delaying/reflecting element according to a second embodiment of the present invention;

FIGS. 7 and 8 are schematic diagrams illustrating optical waveguide recording medium playing apparatuses according to the first and second embodiments.

DETAILED DESCRIPTION OF THE PREFERRED EMBODIMENT

Figure 1A:
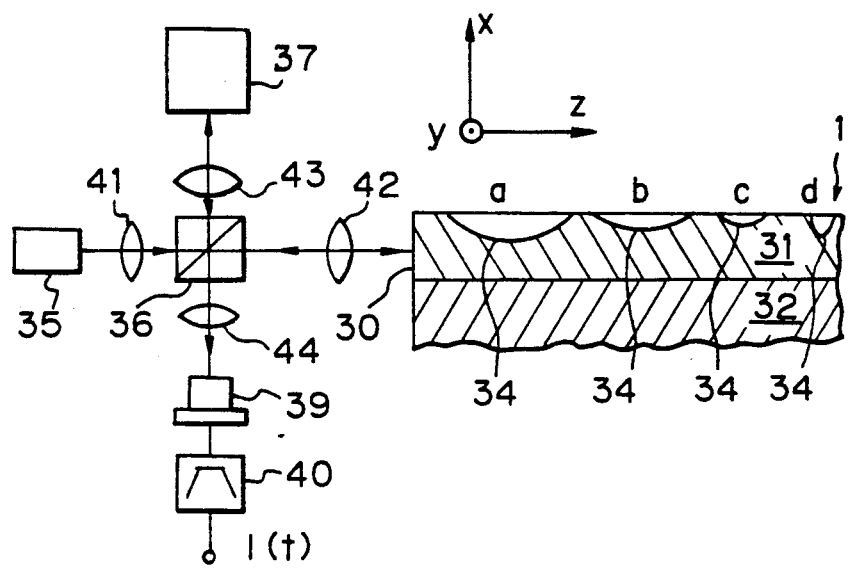
FIGS. 1A-1C are schematic diagrams for explaining the principle of an optical waveguide recording medium playing apparatus according to the present invention.
Figure 1B:
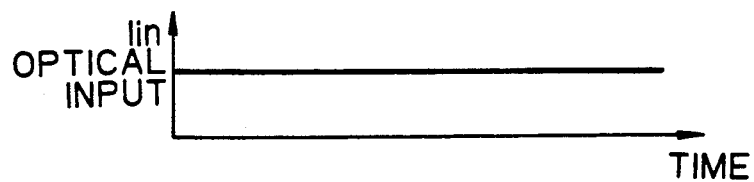
Figure 1C:
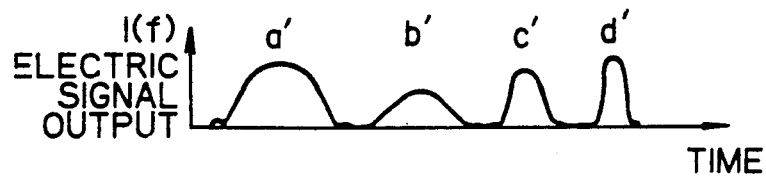

FIGS. 1A-1C are schematic diagrams for explaining the principle of the present invention. In FIG. 1A, an optical waveguide recording medium 1 has such a structure that an optical waveguide of a core 31 where light is guided is formed on a substrate 32 serving as a cladding with a lower refractive index than that of the core. Air or another cladding exists on the upper interface of the core 31. The end surface of the core 31 serves as a photocoupler 30 which guides a laser beam into the interior of core. A plurality of refractive index-discontinuous portions 34 are provided and arranged on the upper interface of the inner surface of the core in the lengthwise direction thereof as recorded information. The refractive index-discontinuous portions 34 are tiny recesses which provide, with respect to the laser beam guided to enter, reflection of the guided beam having various amplitudes and phases (i.e., signal light with modulated amplitudes and phases) in accordance with complex reflectances dependent on their relative positions from the photocoupler 30 at an end face and their shapes. Such shapes and positions of the refractive index-discontinuous portions 34 are recorded to provide predetermined complex reflectances according to information to be recorded. The recesses of the refractive index-discontinuous portions 34 may take the form of embedded portions. If air or claddings whose refractive indices are smaller than that of the core are used as the embedded portions, the refractive index-discontinuous portions 34 are of, for example, semicircular or semielliptic embedded type and are several fractions to several times larger than the light wavelength. The core 31 is formed of, for example, a transparent polycarbonate, and the cladding formed of a polymer material, such as polymethyl methacrylate with a lower refractive index than that of polycarbonate. In short, the optical waveguide recording medium 1 comprises at least the photocoupler 30, the core 31, the substrate 32 and the refractive index-discontinuous portions 34.

Figure 2:
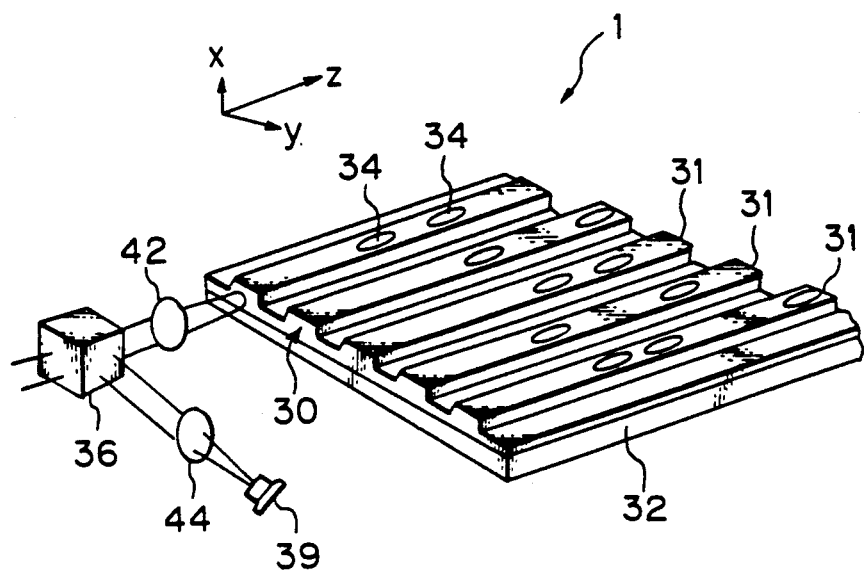
FIG. 2 is a perspective view of the optical waveguide recording medium of the present invention.

FIG. 2 specifically shows another type of optical waveguide recording medium 1. This recording medium 1 is designed in such a way that a plurality of channel type ridge waveguides 31 each having a photocoupler 30 are arranged in parallel on the substrate 32, and a plurality of tiny refractive index-discontinuous portions 34 which provide reflection of guided light with different amplitudes and phases are provided in the core of the optical waveguide in accordance with information to be recorded. Although the ridge waveguides are used for description in this embodiment, they may be of another type, such as a strip or embedded type. As long as the optical waveguides are of such types, if the refractive index-discontinuous portions 34 are formed on the core or the cladding for each optical waveguide, the same effect as realized by the ridge waveguide can be provided.

As shown in FIG. 1A, an optical waveguide recording medium playing apparatus according to the present invention comprises a light-emitting element 35 as a light emitting means for generating a laser beam, such as an SLD (Super Luminescent Diode) or a broad wavelength oscillating laser diode, a half mirror (beam splitter) 36 as a beam splitting means, which bisects the laser beam into first and second light beams, a waveguide light delaying/reflecting element or acoustooptic light delaying/reflecting element 37 as a reference light generating means, which receives the first light beam and Doppler-shifts this beam for its modulation to generate reference light, an objective lens 42 as an irradiating means which guides the second laser beam to the photocoupler 30, a light superimposing means the half mirror 36), which superimposes reflected signal light returning from the refractive index-discontinuous portions 34 on the reference light to provide interference light, and a photodetector 39 as a photodetecting means which performs photoelectric conversion of the interference light to provide an electric output.

The laser beam emanating from the light-emitting element 35 disposed facing the photocoupler 30 of the optical waveguide recording medium 1 is converted into a flux of nearly parallel light by the collimator lens 41, and is then bisected by the half mirror 36. The first laser beam, one of the bisected laser beams, traveling straight is converged by the objective lens 42 and guided through the photocoupler 30 (into the optical waveguide). Part of the guided light becomes reflected light having a plurality of different amplitudes and phases due to the refractive index-discontinuous portions 34, and this reflected light will be signal light returning from the photocoupler 30. When the refractive index-discontinuous portions 34 are provided as information to be recorded at positions a, b, c and d as shown in FIG. 1A (the information is illustrated as analog information in this diagram), the shapes and the relative positions of the refractive index-discontinuous portions 34 can produce modulated signal light having information of different amplitudes and phases as a function of the shape and propagation distance according to the information to be recorded. The other second laser beam split and reflected by the half mirror 36 is reflected on the photocoupler of the waveguide light delaying/reflecting element 37 by a lens 43, and, after undergoing Doppler-shifting, returns as reference light. The signal light and reference light are combined by the half mirror 36, and are converged by the lens 44 to be an optical heterodyne interference input to the photodetector 39. This input light is photoelectrically converted to be an electric signal, which in turn passes through a frequency filter 40, yielding an electric output I(t) with a time-series waveform with respect to a light input Iin of the laser beam of a constant intensity from the light-emitting element 35, as shown in FIGS. 1B and 1C.

Figure 3:
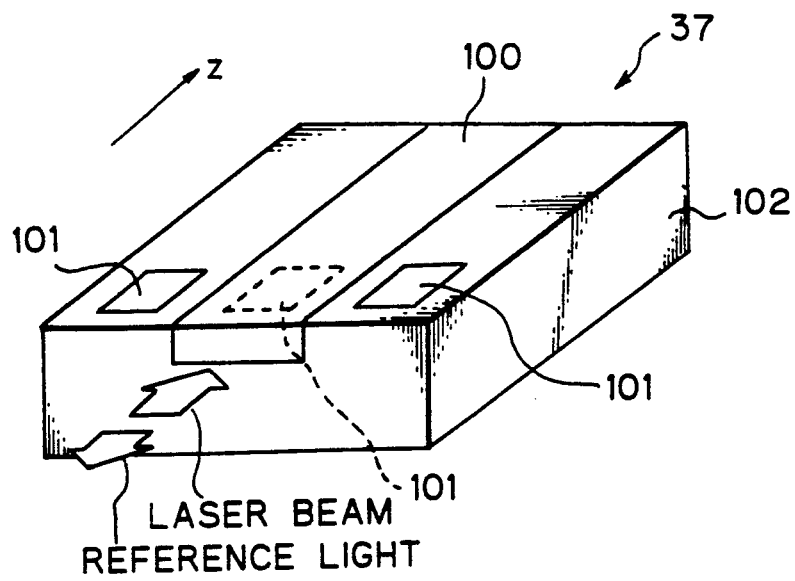
FIG. 3 is a perspective view of a waveguide light delaying/reflecting element according to a first embodiment of the present invention.
Figure 4A:
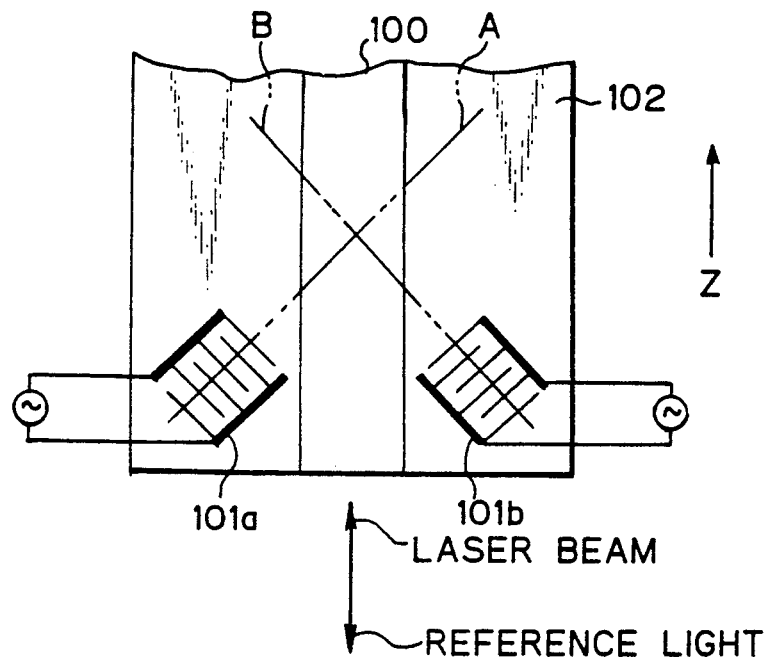
FIGS. 4A-4B are plan views of the waveguide light delaying/reflecting element according to the first embodiment.
Figure 4B:
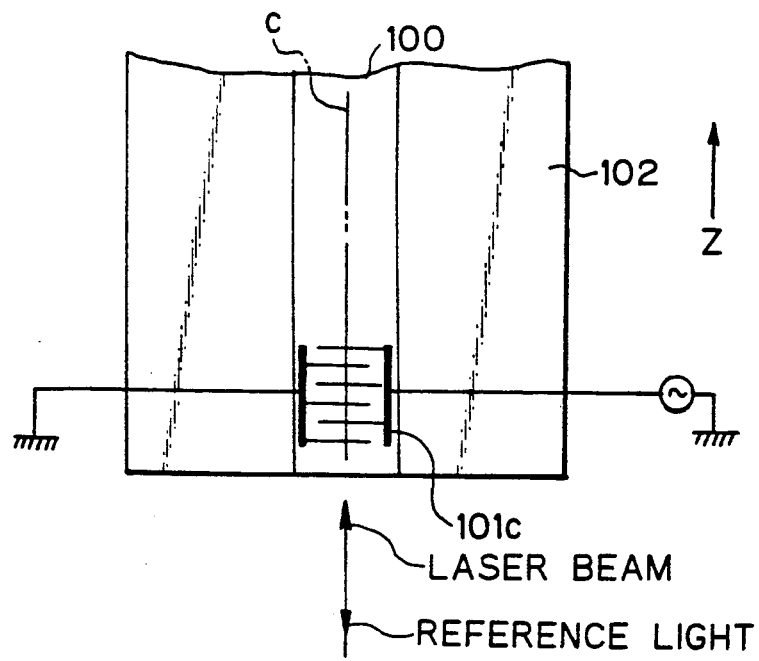

The waveguide light delaying/reflecting element 37 in the first embodiment shown in FIG. 3 has an optical waveguide 100 extending along the optical axis of one of the light beams split by the half mirror 36, and a surface elastic wave electrode 101, disposed in close proximity of the optical waveguide, which generates a surface elastic wave in the light propagation direction of the optical waveguide. This electrode 101 comprises a pair of comb-shaped electrodes 101a and 101b disposed on both sides of the optical waveguide 100, in such a way that their axes A and B for radiation of surface elastic waves cross each other on the optical waveguide, as shown in FIG. 4A. Alternatively, the surface elastic wave electrode may have a comb-shaped electrode 101c disposed on the optical waveguide 100 so that its surface elastic wave radiation axis C coincides with the lengthwise direction of the optical waveguide, as shown in FIG. 4B. The waveguide light delaying/reflecting element 37 has a substrate 102 made of GaAs, $SiO_2$ or $TeO_2$, with Ti, Rb or the like diffused thereon to form the channel type optical waveguide 100. When intermittent high-frequency power is supplied to the surface elastic wave electrode, a surface elastic wave propagates, forming a grating fringe with a refractive index varying at the wavelength intervals in the optical waveguide or grating-shaped corrugation on the surface of the optical waveguide. The grating fringe or corrugation propagates. The light guided through the optical waveguide will produce reflected light by the propagating diffraction grating. Because the reflection surface is moving, however, the reflected light will undergo phase shifting and frequency shifting due to the Doppler effect according to the moving speed. This reflected light will be used as reference light.

In short, this embodiment dispense with a movable mirror for generating reference light which is used in the prior art, but instead utilizes a waveguide type element as a light delaying/reflecting device. This waveguide light delaying/reflecting element has an electrode (transducer) to generate a surface elastic wave, disposed in close proximity of the waveguide through which light travels, so that the surface elastic wave may propagate along the light propagating direction of the optical waveguide. A burst-like modulated high frequency is applied to the electrode in order to guide light that becomes reference light to the optical waveguide to generate such a surface elastic wave.

Further, the use of this waveguide light delaying/reflecting element can allow a light splitting mirror, a coupler for coupling light to an optical waveguide recording medium and a photodetector to be integrated on the same substrate on the pickup portion of the optical waveguide recording medium playing apparatus. This design can miniaturize the light delaying/reflecting device as per the conventional device using a movable mirror, and can impart phase shifting of several times the laser beam wavelength λ than that conventional device with a movable mirror, thus ensuring information reading from a long waveguide of an optical waveguide recording medium.

Figure 6A:
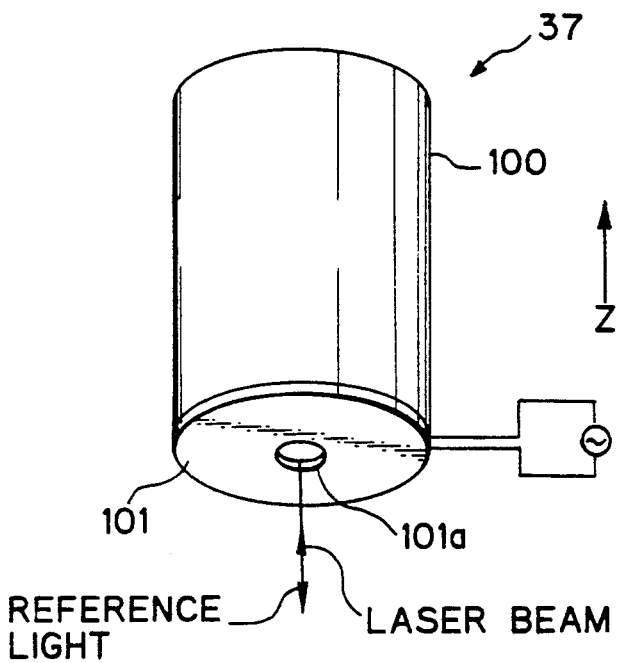
FIGS. 6A-6B are perspective views of the acoustooptic light delaying/reflecting element according to the second embodiment.
Figure 6B:
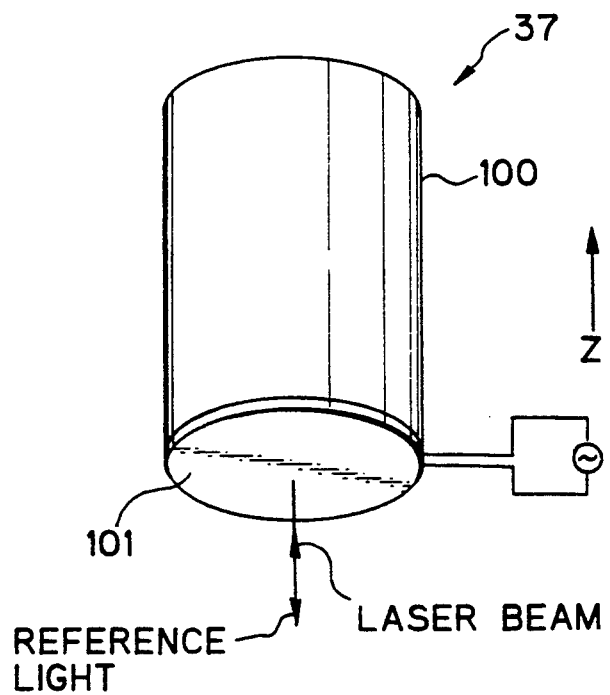

The acoustooptic light delaying/reflecting element 37 in the second embodiment shown in FIG. 5 has a transparent acoustooptic medium block 100 extending along the optical axis of the first light beam split by the half mirror 36, and an ultrasonic wave generating element 101, disposed on the acoustooptic medium block 100 at the end face where the laser beam enters for generating an ultrasonic wave in the light propagating direction of the acoustooptic medium block 100. It is preferable that the ultrasonic wave generating element 101 be an electrostrictive element or a piezoelectric element having an opening 101a through which a laser beam enters, as shown in FIGS. 6A and 6B. The ultrasonic wave generating element 101 may also be formed of an electrostrictive element or piezoelectric element transparent to an incident laser beam. The acoustooptic medium block 100 of the acoustooptic light delaying/reflecting element 37 may be made of a bulk crystal, such as quartz, glass, or $TeO_2$, and an electrostrictive element made of a dielectric material of a barium titanate system or lead zirconate/titanate system, or a piezoelectric element of crystal or the like is formed as the ultrasonic wave generating element 101 on the light incident end face of the block 100. When intermittent high-frequency power is supplied to the ultrasonic wave generating element 100, the propagation of an ultrasonic wave (compression wave in the medium) forms a grating fringe with a refractive index varying at the ultrasonic wavelength intervals in the acoustooptic medium block. Since the wave propagates in the medium, the laser beam in the acoustooptic medium block 100 will undergo phase delay and frequency shifting due to the ultrasonic Doppler effect, and part of the laser beam will be reflected and return along the acoustooptic medium block 100. This reflected light will be used as reference light.

In short, this embodiment dispenses with a movable mirror for generating reference light which is used in the prior art, but instead utilizes an ultrasonic wave generating element as an acoustooptic modulating element which is driven by a burst-like modulated signal. This acoustooptic modulating element has a window formed at one end face of the ultrasonic wave generating element through which a laser beam enters, in such a way that the beam incident direction may be parallel to the propagating direction of an elastic wave produced in the acoustooptic modulating element. In the acoustooptic modulating element driven by a burst-like modulated signal, a traveling compression wave is formed. When the incident laser beam passes this traveling compression wave, it reacts with the diffraction grating formed by the compression wave, producing reflected light. This reflected light is frequency-modulated due to the Doppler effect, and is further phase-shifted because the position of the compression wave is shifting. This laser beam will therefore be used as reference light. This is the same as the conventional movable mirror moving at a certain speed to reflect a laser beam to provide reference light.

The use of the acoustooptic light delaying/reflecting element can miniaturize the light delaying/reflecting device as per the conventional device using a movable mirror, and can ensure information reading from a waveguide of several millimeters of an optical waveguide recording medium longer than that conventional light delaying/reflecting device.

Assume that the center frequency of the SLD as a light-emitting element is $\nu_0$, the effective spectrum width of this light source is $\delta\nu$, the propagation constant of the optical waveguide is $\beta_0$, the propagation constant of a high order is $\beta_1$, and the effective Doppler speed of the acoustooptic light delaying/reflecting element is v.

With the electric field of the reference light being Eref and the electric field of reflected light from the p-th refractive index-discontinuous portion being Ep, the intensity I(z, t) of a detection signal in the photodetector can be expressed by $$I(z, t) = |Er^* \cdot Es| \cos\left[2\pi\nu 0 \frac{2\nu}{c} t - 2\beta 0\right] e - $$

$$\pi\delta\nu \left|\frac{2\nu}{c} t - \frac{\beta 1}{\pi} z\right|$$

The detection signal represented by this equation 1 is detected by the photodetector. As apparent from this equation 1, a beat output signal is incoherent superimposing of broad spectra and is detected as a train of pulses subjected to an exponential amplitude modulation.

The principle of the playing apparatus will be described below. Individual frequency components of the laser beam from the light-emitting element 35 are spontaneously reflected at one refractive index-discontinuous portion and will undergo phase delay proportional to given amplitude propagation distance. The resultant lights interfere with the reference light which has undergone Doppler shifting corresponding to the phase delay. At this time the individual frequency components become in phase to form a single pulse whose amplitude is equal to the sum of the amplitudes of these frequency components. The reflected light components from the next refractive index-discontinuous portion, which further lags in phase, will interfere with the reference light which is to be produced by the waveguide light delaying/reflecting element and imparted with a delayed Doppler frequency, thereby forming the next pulse. Given that the z direction in the orthogonal x-y-z coordinates as shown in FIG. 1A is the longitudinal or lengthwise direction of the optical waveguide 31, and the y direction normal to the z direction is the lateral direction of the waveguide 31, then each pulse width depends on the size of the refractive index-discontinuous portion along the z axis while each amplitude depends on the size of the refractive index-discontinuous portion along the x and y axes.

With the above-described structure of the playing apparatus, a plurality of refractive index-discontinuous portions (indicated by a, b, c and d in FIG. 1A) recorded on the optical waveguide recording medium are reproduced in association with the electric outputs with a time-series waveform (corresponding to a', b', c' and d' in FIG. 1C). Individual pulses have a Nyquist sampling form of sin (F)/F, and a signal waveform is a series of these pulses, where F is a function of the spectral width of light from the light-emitting element 35, the speed of the diffraction grating of the propagating surface elastic wave, the acoustic modulation frequency, the speed of the movable mirror, the refractive index dispersion of the optical waveguide, the sizes and positions of refractive index-discontinuous portions in the optical waveguide medium, and so forth. Proper selection of those values can set the signal modulation frequency in a range from several KHz to several tens of MHz. Each pulse width can also be set within a range from several tens of milliseconds to several tens of nanoseconds. The light-emitting element 35 does not necessarily need a semiconductor laser with a narrow spectral width; rather a semiconductor light-emitting element which generates low coherent light with a broad spectrum width can ensure high modulation frequency. Further, those time-series signal waveforms can be reproduced at a high S/N ratio of $10^2$ to $10^4$ by the optical heterodyne interference method.

Figure 7:
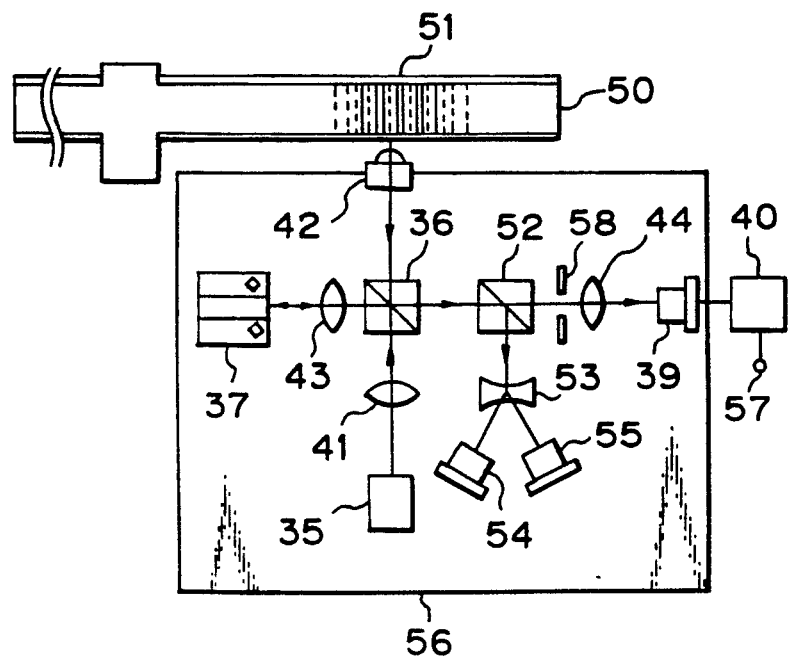

FIGS. 7 and 8 specifically illustrate optical waveguide recording media and playing apparatuses. An optical waveguide recording medium 50 is a three-dimensional (3D) optical disk of a laminated drum type which has a multitude of plate 51, each being the above-described channel type ridge optical waveguide recording medium 1, put side by side and rolled into a drum. In addition to the aforementioned constituents, this playing apparatus comprises a converging lens 42, disposed in a focus actuator, for coupling a laser beam to the optical waveguide, a beam splitter 52 for extracting part of a reflected beam for the tracking purpose, a concave lens 53 for separating the tracking laser beam, and tracking photodetectors 54 and 55. The reflected light acquired by abutting both end portions of the elliptic cross section of the laser beam from the light-emitting element 35 along its longer axis against th cladding end face with the photocoupler (the end face of the core) is used as the tracking laser beam. The photodetectors 54 and 55 ca catch the tracking laser beam at high sensitivity and high S/N ratio even in optical heterodyne detection. The converging microlens 42 or the like is moved along the optical axis to focus the tracking laser beam on the photocoupler of the optical waveguide in accordance with the difference between the detected outputs of both photodetectors 54 and 55, and a pickup head 56 is allowed to follow up the surface vibration of the 3D optical disk 50.

Figure 9:
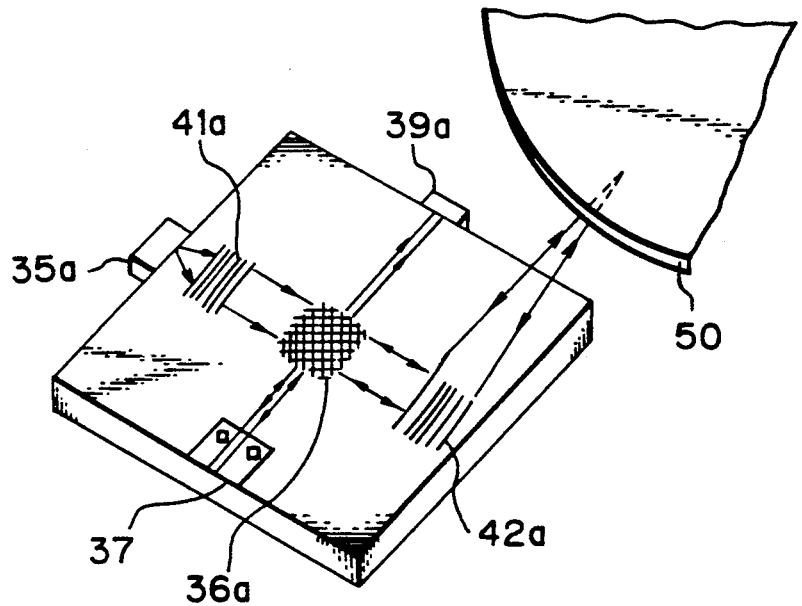
FIG. 9 is a schematic diagram showing a head of an optical waveguide recording medium playing apparatus according to another embodiment of the present invention.

In addition, in the case of using the waveguide light delaying/reflecting element as in the first embodiment, a collimation grating 41a, a grating 36a as a light splitting mirror, and a grating coupler 42a for coupling light to the optical waveguide recording medium 50 may be integrated together with an SLD 35a and a photodetector 39a on the same substrate on which the waveguide light delaying/reflecting element 37 is formed in the pickup portion of the optical waveguide recording medium playing apparatus, as shown in FIG. 9.

According to both embodiments, plates having 10-mm long optical waveguides with a rectangular horizontal cross section of $2 \times 2$ $\mu$m embedded in a 3.2-$\mu$m thick cladding at intervals of 2 $\mu$m are rolled and laminated into a drum to provide the 3D optical disk 50 with a tracking pitch width of 3.2 $\mu$m. The recorded refractive index-discontinuous portions have lengths of 10 to 30 $\mu$m along the z axis depths of 0.1 to 0.5 $\mu$m along the x axis, and widths of about 0.7 $\mu$m along the y axis; an average of 500 such refractive index-discontinuous portions are recorded for each optical waveguide. Since the reflectances of the individual refractive index-discontinuous portions are set $10^{-6}$ to $10^{-8}$ at most, the damping factor of the last returning laser beam will be about 10% even with their reflection losses considered. In the diagrams the cross section of each optical waveguide is open to the lower end face of the 3D optical disk 50 to be the photocoupler. The surface of the photocoupler is coated with a polycarbonate protective film of 2 mm thick to match its refractive index with that of the optical waveguide, thereby improving the degree of the photocoupling. End face of the optical waveguide is also protectively coated to allow simultaneously the light propagating through the waveguide to escape. Such 3D optical disk 50 has a diameter of eight inches, and as in the case of a compact disk (CD), recorded information is reproduced while it is rotating.

The optical waveguide recording medium playing apparatuses are designed as already described in the section of SUMMARY OF THE INVENTION. The laser beam from the light-emitting element 35 is guided to the optical waveguide recording medium 51. Part of the laser beam is subjected to amplitude and phase modulations to be a signal reflected laser beam and return to the half mirror 36 while the other part of the laser beam reaches the waveguide light delaying/reflecting element 37 and returns therefrom to the half mirror 36. These beam components are combined by the half mirror 36, and the resultant beam reaches, via an iris 58 which passes only signal light, the photosensor 39 for optical heterodyne detection. The output of the photodetector 39 is sent through the frequency filter 40 to an electric output terminal 57 from which an electric output with the time-series signal waveform as indicated by I(t) in FIG. 1C will be acquired. The reproduced signal from one optical waveguide recording medium is temporarily accumulated in a buffer memory, and is transferred therefrom at an arbitrary clock time. After information recorded in one optical waveguide is read out, information recorded on the optical waveguide of the next channel will be read out consecutively by performing the tracking of the head 56 of the playing apparatus while rotating the 3D optical disk 50.

In the present embodiments where an SLD with a center wavelength of emitted light of 1.3 $\mu$m and a spectral width of approximately $2 \times 10^{12}$ Hz is used as the light-emitting element 35, the acoustic modulation frequency is 355 MHz or 2.75 GHz, and the optical waveguide recording medium has an optical waveguide with a refractive index dispersion of 0.14 and with refractive index-discontinuous portions of the averaged size and relative positions of 20 $\mu$m, the reproducing frequency of about 30 MHz can be achieved. At this time, the minimum pulse width is approximately 35 nanoseconds. The optical output of the light-emitting element 35 is about 1 mW, and a large S/N ratio of 104 of the optical heterodyne interference output based on the reflected light from each refractive index-discontinuous portion and reference light can be accomplished. The total memory capacity in terms of a digital quantity is 500 times that of existing compact disks (1 Gbyte: gigabytes), and the mechanical access time per bit is 1/500 while about 14 times higher bit cycle time can be achieved.

The foregoing description of the embodiments has been given with reference to the case where the memory portion of each optical waveguide recording medium is constituted by long and short, large and small refractive index-discontinuous portions and an analog signal is stored in the memory portion and reproduced therefrom. If the refractive index-discontinuous portions of the same size are arranged at equal intervals to record their presence or absence, storage and reproduction of a digital signal will also be obviously possible.

Further, while the foregoing description discusses optical waveguide recording media formed into a 3D optical disk, they may be laminated one on another in the form of a tape or a card. In addition, although the length of the optical waveguide is set to 10 mm in the embodiments, it may be made longer or shorter in accordance with the necessary memory capacity.

As described above, according to the first embodiment of the present invention, the reference light generating means in the optical waveguide recording medium playing apparatus having a heterodyne detection optical system includes a waveguide light delaying/reflecting element having an optical waveguide extending along an optical axis of an incident laser beam and a surface elastic wave electrode, disposed in close proximity of the optical waveguide, for generating a surface elastic wave in the light propagating direction of the optical waveguide. This design can provide an optical waveguide recording medium playing apparatus which can produce reference light with a broadened modulation frequency in order to supply intermittent high-frequency power to the surface elastic wave electrode.

According to the second embodiment of the present invention, the reference light generating means in the optical waveguide recording medium playing apparatus having a heterodyne detection optical system includes an acoustooptic light delaying/reflecting element having a transparent acoustooptic medium block extending along an optical axis of the incident laser beam and an ultrasonic wave generating element, disposed on the acoustooptic medium block at the end face where the first light beam enters, for generating an ultrasonic wave in a light propagating direction of the acoustooptic medium block in order to supply intermittent high-frequency power to the ultrasonic wave generating element. This design can provide an optical waveguide recording medium playing apparatus which can produce reference light with a broadened modulation frequency.

What is claimed is:

1. A playing apparatus for reproducing recorded information from an optical waveguide recording medium provided with an optical waveguide having a photocoupler for guiding a laser beam and a plurality of refractive index-discontinuous portions aligned on the optical waveguide, shapes and relative positions of the refractive index-discontinuous portions being variables of information to be recorded, the apparatus comprising:

a light emitting means for generating a laser beam;

a beam splitting means for bisecting the laser beam into first and second light beams;

a reference light generating means for receiving the first light beam and frequency-shifting the first light beam for modulation to generate reference light;

an irradiating means for guiding the second light beam to the photocoupler;

said beam splitting means further includes a light superimposing means for superimposing reflected signal light, reflected at the refractive index-discontinuous portions, subjected to amplitude and phase modulations, and returning via the photocoupler, onto the reference light to produce interference light; and a photodetecting means for performing photoelectric conversion of the interference light to provide an electric output, the reference light generating means including a waveguide light delaying/reflecting element having an optical waveguide extending along an optical axis of the first light beam and a surface elastic wave electrode, disposed in close proximity of the optical waveguide, for generating a surface elastic wave in a light propagating direction of the optical waveguide in order to supply intermittent high-frequency power to the surface elastic wave electrode.

2. A playing apparatus according to claim 1, wherein amplitude and delay time of the reflected signal light are detected as a time-series electric signal by detecting a beat output component from the photodetecting means.

3. A playing apparatus according to claim 1 or 2, wherein the surface elastic wave electrode is a pair of comb-shaped electrodes disposed on both sides of the optical waveguide in such a way that surface elastic wave radiation axes of the comb-shaped electrodes cross each other on the optical waveguide.

4. A playing apparatus according to claim 1 or 2, wherein the surface elastic wave electrode is a comb-shaped electrode disposed on the optical waveguide in such a way as to have a surface elastic wave radiation axis matching with a lengthwise direction of the optical waveguide.

5. A playing apparatus according to claim 1, wherein the light emitting means has a super luminescent diode or a broadband wavelength oscillating laser diode.

6. A playing apparatus according to claim 1, wherein the beam splitting means has a half mirror or a beam splitter.

7. A playing apparatus according to claim 1, wherein the irradiating means has an objective lens.

8. A playing apparatus according to claim 1, wherein the light superimposing means has a half mirror or a beam splitter.

9. A playing apparatus according to claim 1, wherein the photodetecting means has a photodetector.

10. A playing apparatus for reproducing recorded information from an optical waveguide recording medium provided with an optical waveguide having a photocoupler for guiding a laser beam and a plurality of refractive index-discontinuous portions aligned on the optical waveguide, shapes and relative positions of the refractive index-discontinuous portions being variables of information to be recorded, the apparatus comprising:

a light emitting means for generating a laser beam;

a beam splitting means for bisecting the laser beam into first and second light beams;

a reference light generating means for receiving the first light beam and frequency-shifting the first light beam for modulation to generate reference light;

an irradiating means for guiding the second light beam to the photocoupler;

said beam splitting means further includes a light superimposing means for superimposing reflected signal light, reflected at the refractive index-discontinuous portions, subjected to amplitude and phase modulations, and returning via the photocoupler, onto the reference light to produce interference light; and a photodetecting means for performing photoelectric conversion of the interference light to provide an electric output, the reference light generating means including an acoustooptic light delaying/reflecting element having a transparent acoustooptic medium block extending along an optical axis of the first light beam and an ultrasonic wave generating element, disposed on the acoustooptic medium block at the end face where the first light beam enters, for generating an acoustic wave in a light propagating direction of the acoustooptic medium block in order to supply intermittent high-frequency power to the ultrasonic wave generating element.

11. A playing apparatus according to claim 10, wherein amplitude and delay time of the reflected signal light are detected as a time-series electric signal by detecting a beat output component from the photodetecting means.

12. A playing apparatus according to claim 10 or 11, wherein the ultrasonic wave generating element comprises an electrostrictive element or piezoelectric element having an opening through which the laser beam enters.

13. A playing apparatus according to claim 10 or 11, wherein the ultrasonic wave generating element comprises a transparent electrostrictive element or piezoelectric element.

* * * * *